(No Model.)

L. C. BALDWIN.
HOSE REEL.

No. 321,172. Patented June 30, 1885.

WITNESSES:
Chas. Nida.
C. Sedgwick.

INVENTOR:
L. C. Baldwin
BY Munn & Co.
ATTORNEYS.

UNITED STATES PATENT OFFICE.

LUTHER C. BALDWIN, OF MANCHESTER, NEW HAMPSHIRE, ASSIGNOR TO JOHN CHASE THURSTON, OF SAME PLACE.

HOSE-REEL.

SPECIFICATION forming part of Letters Patent No. 321,172, dated June 30, 1885.

Application filed July 8, 1884. (No model.)

*To all whom it may concern:*

Be it known that I, LUTHER C. BALDWIN, of Manchester, in the county of Hillsborough and State of New Hampshire, have invented a new and useful Improvement in Hose-Reels, of which the following is a full, clear, and exact description.

Reference is to be had to the accompanying drawings, forming a part of this specification, in which similar letters of reference indicate corresponding parts in both the figures.

Figure 1:
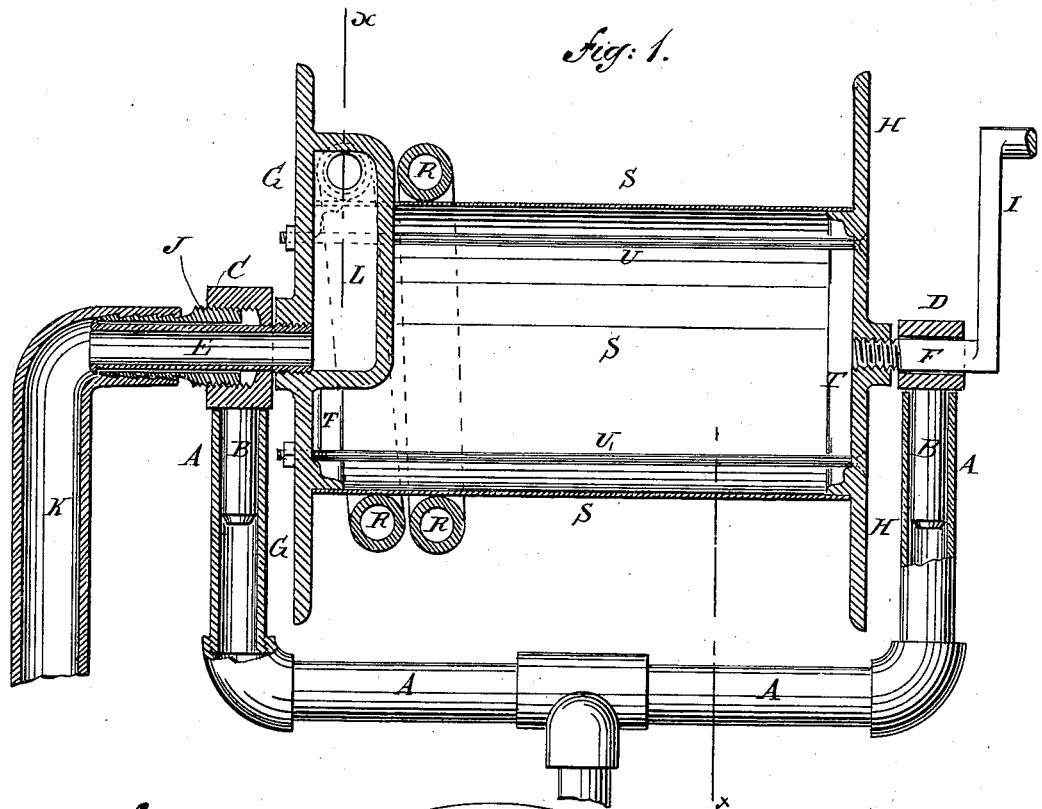
Figure 2:
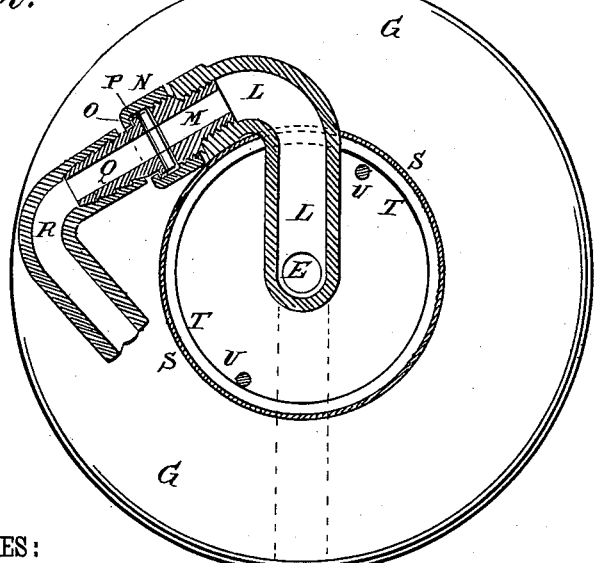

Figure 1 is a sectional front elevation of my improvement. Fig. 2 is a sectional end elevation of the same, taken through the broken line x x, Fig. 1.

The object of this invention is to promote convenience in the use and care of small hose, such as is used in sprinkling lawns, gardens, and sidewalks, washing windows, and for other similar purposes.

The invention consists in a hose-reel constructed as will be hereinafter described, and specifically pointed out in the claims.

A represents a U-shaped support formed of gas-pipe or other suitable material, and which is designed to be secured to the ground or to the side of a building, near the faucet or discharge end of the water-pipe from which the water to be used is obtained. Into the open upper ends of the arms of the support A are inserted pins B, formed upon the bearings C D, in which the journals E F of the spool-heads G H revolve. The journal F is provided with a crank, I, by means of which the reel is turned to wind up the hose. The journal E is made tubular and revolves in the inner part of the bearing C and in the short tube or nozzle J, screwed into or otherwise secured in the countersunk outer part of the said bearing C. The projecting outer end of the tube J is corrugated or otherwise prepared to receive the end of a rubber tube, K, the other end of which is designed to be attached to the end of the water-supply pipe or to a faucet attached to the said pipe. The inner end of the hollow journal E opens into the passage L, formed upon the inner side of the head G, and which extends radially to the outer side of the drum of the spool, and is then curved to one side, and has a screw-hole formed in it to receive the screw-thread of the smaller inner end of the screw-plug M.

Upon the larger outer end of the screw-plug M is formed a screw-thread fitting into the interior screw-thread of the band N. Upon the outer edge of the band N is formed an inwardly-projecting flange, O, to engage with the outwardly-projecting flange P, formed around the base of the nozzle Q, the outer part of which is corrugated to receive the end of the hose R, which is thus coupled to the spool.

The drum of the spool is formed of a sheet-metal hollow cylinder, S, the ends of which rest upon annular flanges or shoulders T, formed upon the heads G H. The heads G H are connected and held against the ends of the hollow cylinder S by tie-rods or long bolts U, passed through the said heads within the circle of the said hollow cylinder S, as shown in Figs. 1 and 2.

With this construction the hose R can be used when wound upon the spool or when partly or wholly unwound therefrom, and can be unwound from and wound upon the spool while being used, if desired.

When the water-supply faucet is closed and the connection therewith loosened, the water can be discharged from the hose R by turning the reel in the direction to wind up the hose.

When not in use, the spool, with the hose wound upon it, can be lifted off the support A and taken to a place of shelter; and at the close of the season the support A can also be detached and stored until again required for use.

In case it is desired to leave the reel upon its support, it can be protected from the weather by a canvas cover or awning attached to a wire frame secured to the said support.

Having thus described my invention, I claim as new and desire to secure by Letters Patent—

1. In a hose-reel, the combination, with the U-shaped frame A and the removable bearings C D, of the drum having heads G H, the former provided with passage L, the journal F, passing through the bearing D and screwed into the head H, the hollow journal E, screwed into the head G and communicating with the passage L, a coupling for connecting the journal E with the water-supply, and a hose-coupling communicating with the passage L, substantially as set forth.

2. In a hose-reel, the combination, with the spool-journals E F, of the bearings C D, having pins B, and the tubular U-support A, substantially as herein shown and described, whereby the said spool will be firmly supported, and can be readily attached to and detached from its support, as set forth.

LUTHER C. BALDWIN.

Witnesses:
   J. G. DEARBORN,
   ALEX. COCHRANE.